Sept. 25, 1962 W. J. WRIDE 3,055,879
RECOVERY OF OLEFIN POLYMERS FROM SOLUTION
Filed Sept. 14, 1956
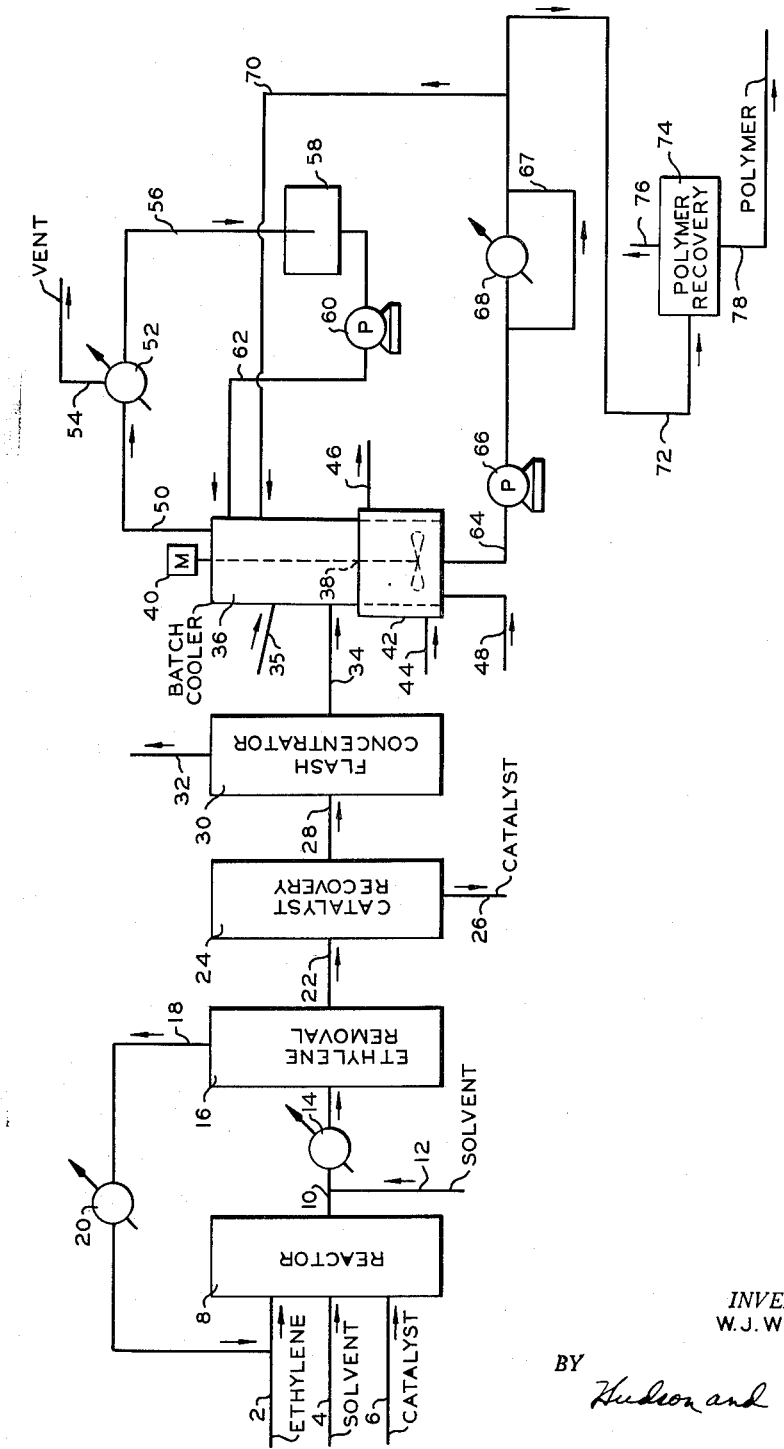
INVENTOR.
W. J. WRIDE
BY *Hudson and Young*
ATTORNEYS

3,055,879
RECOVERY OF OLEFIN POLYMERS FROM SOLUTION

William James Wride, Bartlesville, Okla., assignor to Phillips Petroleum Company, a corporation of Delaware
Filed Sept. 14, 1956, Ser. No. 609,988
9 Claims. (Cl. 260—94.9)

This invention relates to the recovery of solid olefin polymers from solution. In one aspect, it relates to a recovery system wherein solid olefin polymers are precipitated from solution by controlled cooling by vaporizing liquid from the solution by reducing the pressure thereon, followed by additional polymer precipitation by cooling supplied without vaporizing liquid from the solution.

Solid olefin polymers treated in the method of this invention are prepared by a method which usually results in a product which is dissolved in a diluent or solvent material. Inasmuch as the polymers are usable primarily in a solvent-free condition, it becomes necessary to precipitate or otherwise remove the solid polymer from solution. Various methods have been proposed for this purpose. However, difficulties have arisen in that certain characteristics of the polymer products appear to be affected by the particular separation process employed. Thus, in one process the polymer is precipitated from solution in a "superfine" condition of subdivision which makes it difficult to effect recovery of the precipitated solid from the solvent. In another method, the precipitated polymer contains a quantity of small particles which form imperfections when the polymer is formed into a film product. These imperfections which are usually of a size to be just perceptible to the eye are sometimes called "fish eyes" in the art. In other methods of treatment, the polymer removed from solution is stringy or fibrous in nature, and therefore, does not provide the type of product which is readily recovered from the solvent by filtration, centrifugation or other conventional means. In general, it is desirable to obtain a homogeneous product that is solid polymer having a substantially uniform product size or range of size so that separation of the precipitated material from the solvent is readily effected and so that quality control of finished products of the polymer can be established.

In one method precipitation of the polymer is effected by controlled cooling of the polymer solution. The process is carried out in a batch cyclic operation in which the first step consists of filling a cooling zone with the polymer solution. The cooling zone is then blocked off and the pressure therein is slowly reduced, at a sufficient rate to provide a relatively constant temperature drop in the solution. More usually the temperature is decreased at a rate of between about 1° F. and about 20° F. per minute. After the desired proportion of polymer has precipitated, which may be as high as 90 to 98 percent of the total polymer, the cooling vessel is opened and a slurry of polymer and solvent is discharged therefrom. Following this operation, a reheating step is provided whereby the cooling vessel is heated to an appropriate temperature level and polymer solution is again admitted thereto for cooling and precipitation. It is preferable in carrying out the aforedescribed cyclic operation to provide a number of cooling zones in parallel so that a continuous flow of effluent from the polymerization reaction zone can be treated.

In accordance with the invention disclosed herein it has been found that frequently when olefin polymers such as polymers of ethylene are precipitated from solution a major portion of the polymer leaves solution at a temperature which corresponds to the boiling point at atmospheric pressure of the solvent employed. Thus, it is possible to obtain a major portion of the desired polymer precipitate by controlled cooling but without the necessity of providing vacuum equipment.

The method disclosed herein is an improvement in an autorefrigeration-precipitation process.

It is an object of this invention to provide an improved method for the recovery of solid polymers of olefins from solution.

Another object of this invention is to provide improved method for the precipitation of solid olefin polymers from solution.

Still another object of this invention is to provide an improved method for controlled particle size of solid olefin polymers precipitated from solution.

Yet another object of this invention is to provide an improved method for recovering a homogeneous product of solid olefin polymers from solution.

These and other objects of the invention will become more readily apparent from the following description and discussion.

The foregoing objects are achieved broadly by introducing solid olefin polymers which are dissolved in a solvent material into a batch cooling zone wherein the solution is cooled at a controlled uniform rate by vaporizing liquid from the solution by reducing the pressure on the system until said pressure reaches substantially atmospheric whereby a major portion of the polymer precipitates. Following this, a further reduction in temperature of the polymer solution is provided, without vaporizing liquid from the solution, whereby additional polymer is precipitated.

As used herein the term "substantially atmospheric" is intended to include pressures in the range of 1 to 2 pounds per square inch above and below atmospheric pressure.

In one aspect of the invention, the addition reduction in temperature is provided by introducing cold solvent to the batch cooler. In another aspect of the invention, the additional cooling is provided by indirect heat exchange. In still another aspect, to be described in more detail hereinafter, the invention relates to a process comprising batch controlled cooling down to atmospheric pressure followed by cooling under a slight vacuum provided by a barometric leg or by other appropriate means, followed in turn by a final cooling step.

The polymers which are treated within the scope of this invention include a wide variety of olefin polymers such as for example polymers or copolymers of mono-olefins like ethylene, propylene, butylene, etc., also copolymers of mono-olefins and diolefins such as butadiene, isoprene, etc. The invention is particularly applicable to polymers of one olefin having a maximum of 8 carbon atoms per molecule and no branching nearer the double bond than the 4-position and more particularly to polymers of ethylene which have a specific gravity of at least 0.94 at 20° C. and preferably 0.96 or higher and a crystallinity of at least 70 percent and preferably at least 80 percent at ordinary atmospheric temperatures.

A preferred polymerization method is described in detail in a copending application of Hogan and Banks, Serial No. 573,877, filed March 26, 1956, now Patent No. 2,825,721. This particular method utilizes a chromium oxide catalyst, preferably containing hexavalent chromium with silica, aluminia, silica-alumina, zirconia, thoria, etc. In one embodiment of this application, olefins are polymerized in the presence of a hydrocarbon diluent, for example an acyclic, cycloalicyclic or, less preferably, aromatic compound which is inert and in which the formed polymer is soluble. The reaction is ordinarily carried out at a temperature between about 150° F. and about 450° F. and usually under a pressure sufficient to maintain the reactant and diluent in the liquid state. The polymers produced by this method, particularly the polymers of ethylene, are characterized by having an unsaturation which is principally either transinternal or terminal vinyl, depending on the particular process conditions employed. When low reaction temperatures, about 150° F. to about 320° F., and a mobile catalyst are used for polymerization, the product polymer is predominantly terminal vinyl in structure. When polymerization is carried out at higher temperatures and in a fixed catalyst bed, the polymer has predominantly transinternal unsaturation. Polymers prepared by both methods are also characterized by their high densities and high percentage of crystallinity at ambient temperatures.

Other less advantageous procedures which employ different catalyst are also used for preparing olefin polymers. For example, polymers are prepared in the presence of organometallic compounds such as triethylaluminum plus titanium tetrachloride, mixtures of ethyl aluminum halides with titanium tetrachloride, and the like. Another group of catalysts which is used comprises a halide of a group IV metal such as, for example, titanium tetrachloride, silicon tetrabromide, zirconium tetrachloride, tin tetrabromide, etc., with one or more free metals selected from the group consisting of sodium, potassium, lithium, rubidium, zinc, cadmium and aluminum.

The temperature required for polymerizing olefins varies over a wide range. However, usually it is preferred to carry out the reaction at a temperature between about 150° F. and about 450° F. The particular temperature to be employed in each individual case depends on the catalyst used, the olefin to be polymerized and the operating conditions employed, such as pressure, space velocity, diluent to olefin ratio, etc.

The polymerization pressure is usually maintained at a sufficient level to assure a liquid phase reaction, that is at least about 100 to 300 p.s.i.g., depending upon the type of feed material and the polymerization temperature. Higher pressures up to 500 to 700 p.s.i.g. or higher can be used, if desired. If it is desired to carry out the process in the vapor state much lower pressures, down to atmospheric, can be employed. When utilizing a fixed bed the space velocity varies from as low as about 0.1 to about 20 volumes of feed per volume of catalyst, with the preferred range being between about 1 and about 6 volumes per volume per hour. When operating with a mobile catalyst it is desirable to maintain the catalyst concentration in the reaction zone between about 0.01 and about 10 percent by weight. Resident time can be from 10 minutes or less to 10 hours or more.

The use of a diluent in the polymerization reaction in general serves two purposes. Since the reactions are usually exothermic in nature, the presence of a quantity of diluent provides a method for obtaining close control of the reaction temperature. In addition, polymers formed in the reaction or a portion thereof may be tacky in nature and, if this is the case, the presence of a diluent tends to prevent adherence of the polymer to the walls of the reaction vessel and the recovery equipment which is used in treating the effluent from the polymerization reaction. In general, the quantity of diluent is large relative to the olefin feed material. Usually the olefin constitutes between about 0.1 and about 25 percent by volume of the mixture and preferably between about 2 and about 15 percent by volume.

The solvent or diluent employed in the polymerization reaction includes in general, paraffin hydrocarbons. Among the more useful solvents are acyclic paraffins having between about 3 and about 12 carbon atoms per molecule, such as, for example, propane, isobutane, n-pentane, isopentane, isooctane, etc., and preferably those acyclic paraffins having 5 to 12 carbon atoms per molecule. Also useful in the polymerization reaction are alicyclic hydrocarbons, such as cyclohexane, methylcyclohexane, etc. Aromatic diluents are not normally used because they (or impurities therein) tend to shorten the catalyst life; however, if catalyst life is not an important factor in the process, solvents of an aromatic nature can also be employed. All of the foregoing and in addition, other hydrocarbon diluents which are relatively inert, nondeleterious, and in the liquid state at the reaction conditions can also be employed in carrying out the reaction of olefins to form solid polymers.

In carrying out the invention, in one embodiment thereof, effluent from a polymerization reaction comprising a solution of solid olefin polymer in a hydrocarbon solvent, such as solid ethylene polymer in cyclohexane, which has been treated for the removal of catalyst and unreacted olefin is introduced to a batch cooling zone. Generally, several zones are provided in parallel so that reaction effluent is continuously entering at least one zone. However, if desired the operation can be carried out with only one cooling zone by providing surge capacity for the reaction zone effluent. After filling of the cooling zone is completed the flow of material thereto is stopped and cooling of the solution in the zone is commenced by autorefrigeration, namely by reducing the pressure on the zone, whereby there is provided a uniform controlled decrease in temperature. The solubility of the olefin polymers in the solvent material is a function of temperature and as the material in the cooling zone is cooled polymer begins to precipitate from solution. The cooling process is continued until the pressure on the cooling zone is reduced to substantially atmospheric pressure. At this point, the major amount of polymer originally in solution, namely, between about 55 and about 95 percent by weight of the total dissolved polymer, is precipitated.

After the autorefrigeration portion of the precipitation cycle is completed additional polymer is precipitated by further cooling the polymer solution. Several methods for accomplishing the additional cooling are provided. In one method cold solvent is introduced directly to the batch cooling zone whereby the desired further drop in temperature of the polymer solution is obtained. In another method additional cooling is provided by indirect heat exchange such as by providing a double wall batch cooling zone and passing therethrough a coolant, or by removing polymer slurry from the batch cooling zone and passing it through a heat exchanger. Generally, sufficient additional cooling is provided to remove at least 96 to 98 percent by weight of the total polymer in the solution introduced to the batch cooler. However, it is within the scope of the invention to retain in solution larger quantities of polymer and the material which remains dissolved in the diluent after the supplemental cooling may amount to as high as 5 to 10 percent or higher of the total polymer.

To provide a homogeneous product of the desired particle size, it is necessary that the rate of cooling during the autorefrigeration cycle be carefully controlled to provide a uniform drop in temperature in the polymer solution. Cooling at too slow a rate produces a product having a very fine particle size which is difficult to filter. Shock chilling on the other hand frequently produces a jelly-like material which also prevents recovery problems. In general it has been found desirable to cool the solution between about 1° F. and about 20° F. per minute and preferably between about 5° F. and about 15° F. per minute. For the best results an even narrower cooling range is employed, namely, from between about 6° F. to about 9° F. per minute. The cooling rate employed during the supplemental cooling step is also preferably maintained within the ranges given. However, since the major portion of the polymer is precipitated by autorefrigeration the rate of cooling employed subsequent thereto is not so critical. The bulk density of dried product obtained by cooling in this manner varies between about 8 and about 20 pounds per cubic foot, more usually between about 10 and about 12 pounds per cubic foot. The size of the precipitated particles varies usually from between about 50 to about 500 microns.

The operating temperature range in the batch cooler is determined by the temperature at which the polymer precipitates from solution. This in turn is a function of the molecular weight of the polymer and the specific solvent or diluent used. For example, with an ethylene polymer having a molecular weight of between about 15,000 and 25,000, it has been found that a substantial portion of the polymer will precipitate from isooctane at about 180° F. and from cyclohexane at about 165° F. When a heavier polymer, for example, an ethylene polymer having a molecular weight between about 35,000 and about 45,000 is treated, substantial precipitation takes place from cyclohexane at about 170° F. Usually the autorefrigeration cycle reduces the temperature between about 50 and about 150° F. The additional temperature decrease provided by the supplemental cooling step is usually somewhat smaller than this, for example, between about 25 and about 100° F. In general, it is desirable that the concentration of polymer in the diluent entering the cooling zone be maintained at a low level, usually between about 1 and about 15 percent by weight and preferably between about 3 and about 6 percent by weight.

As previously mentioned, prior art methods of recovering solid polymers from solution by precipitation have suffered from a number of disadvantages and in many instances the physical properties of the recovered polymer have been such as to make separation of precipitated polymer from the solvent by filtration difficult. In the method of this invention, the polymer is precipitated as a substantially homogeneous product in that it contains particles having substantially uniform characteristics and within a range of size so as to make them easily separated from the liquid by conventional separation means such as, for example, filtration, centrifugation, etc. In addition, the homogeneity of the product obtained by this invention has made close quality control of finished polymer products possible.

Once the autorefrigeration portion of the cycle has been stopped, it is necessary to remove the polymer solution and precipitated polymer from the batch cooler. It has been found desirable before commencing the removal operation to provide agitation in the cooler in order to form a slurry of polymer in solvent and thereby prevent polymer from settling to the bottom of the cooler and plugging the slurry removal line. Agitation can be provided by suitable mechanical means. While preagitation provides satisfactory removal of the polymer and solution from the batch cooler, it has been found in certain instances and with certain polymers that a stringy polymer is produced as a result of mechanical agitation. This is true even though the polymer previously precipitated is in the desired homogeneous particle form. The reason for this phenomenon is not known; however, it has been found possible to define the conditions of stringy polymer formation in terms of temperature range. Thus, for example, when treating polymers of ethylene having a molecular weight in the range of 30,000 to 50,000 it has been found that mechanical agitation of the precipitated polymer in cyclohexane is undesirable when the temperature is in the range of 170 to 180° F. In a cyclohexane-polymer system temperatures of 170° F. and 180° F. correspond to equilibrium pressures of about 13.2 and 16 p.s.i.a. Below 170° F. mechanical agitation appears to have little effect on the characteristics of the precipitated polymer.

In systems containing other polymers and/or other solvents the undesirable temperature range for agitation will vary from the specific example given, however, usually the variation in temperature is between about 10 and about 20° F. in magnitude and the absolute temperature range is such that the solvent vapor pressure is in the region of and slightly below atmospheric pressure.

As previously stated in one embodiment of the invention, the additional cooling required for precipitation of the desired amount of polymer from solution can be provided by introducing cold solvent to the batch cooling zone. If this method of operation is followed the temperature can be reduced below the range wherein stringy polymer is obtained, without providing mechanical agitation, following which removal of the polymer from the cooling zone, accompanied by agitation sufficient to keep the solid polymer in suspension, can be effected.

In another embodiment, the present invention provides a method for passing the precipitated polymer and polymer solution through the agglomerating temperature range without introducing cold solvent to the batch cooling zone. This method makes use of a barometric leg or other limited source of vacuum in combination with the autorefrigerant condenser system which is provided in conjunction with the autorefrigeration system for reducing the pressure on the batch cooling zone. By the use of a barometric leg a slight vacuum can be obtained which is sufficient to reduce the temperature of the polymer solution below the point where stringy polymer is produced. The barometric leg should be of sufficient height to offset the pressure drop in the autorefrigerant condenser system and allow a certain limited amount of vacuum operation without the necessity of an ejector system or vacuum pump for the removal of inerts. Any small amount of air or inert gases which enter the system, either with the feed or during the vacuum portion of the cycle, can be purged from the condenser and accumulator during that portion of the cycle when the condenser is operating above atmospheric pressure. Usually, the condenser operates under a vacuum for only a short portion of the cycle. For example, if the filling and cooling cycle requires about 15 minutes, the condenser usually will operate under a vacuum for not more than about 5 minutes and usually for a shorter period of time.

In order to more clearly describe the invention and provide a better understanding thereof, reference is had to the accompanying drawing which is a diagrammatic illustration of a polymerization unit and associated equipment for recovering polymer from solution, including a reaction and catalyst separation system, a batch cooler for the removal of polymer from solution by controlled cooling and precipitation and auxiliary cooling means for further reducing the temperature of the polymer solution and precipitating additional polymer. Referring to the FIGURE, ethylene, chromium oxide catalyst and cyclohexane diluent are introduced to reactor 8 through conduits 2, 4 and 6 respectively. For ease of handling, the catalyst is slurried in cyclohexane before it is introduced to the reactor. During polymerization the material in the reactor is maintained in a highly agitated state by means of a mechanical mixer or other conventional mixing means (not shown). The reaction is carried out at a temperature at about 285° F. and a pressure of about 500 p.s.i.a., and for a sufficient period of time to convert a portion of the ethylene feed to solid ethylene polymer. The reaction effluent leaves the reactor through conduit 10 and is combined with additional solvent introduced through conduit 12. The mixture then passes through an exchanger 14 wherein the temperature is increased. Following this the reaction product enters a separation zone 16 wherein a stream comprising principally unconverted ethylene and some solvent is separated and returned to the reactor through conduit 18 and cooler 20. The effluent then passes to catalyst recovery zone 24 through conduit 22. This zone may be a filter, a centrifuge, or the like designed to operate at superatmospheric pressure. Separated catalyst, which is removed through conduit 26, can be recycled to the reactor or discarded. As necessary, all or part of the recycled catalyst can be subjected to a regeneration treatment with oxygen for the removal of heavy polymers deposited thereon during polymerization. The remaining reaction effluent, now comprising a solution of polyethylene in cyclohexane, is introduced to flash concentrator 30. In this vessel cyclohexane is vaporized, removed through conduit 32 and recycled to the cyclohexane feed to the reactor (not shown). In this manner the concentration of diluent in the reaction effluent is reduced to a suitable level for the batch cooling operation. Removal of cyclohexane in the flash concentrator is effected by reducing the pressure, or by increasing the temperature, or both.

The polymer solution at about 225° F. from the flash concentrator passes through conduit 34 into batch cooler 36. As signified by the term "batch" this portion of the process is non-continuous in nature. Therefore, it is desirable to provide several batch coolers in parallel (not shown) so that material from the concentrator continuously enters at least one batch cooler. Prior to entry of the solution into the batch cooler the vessel is heated by suitable means, such as by warm cyclohexane, introduced through conduit 35, to a suitable temperature level to prevent precipitation of polymer from the solution during filling of the cooler. The flow through conduit 34 is continued until the solution in batch cooler 36 reaches a predetermined level at which time the flow is switched to another batch cooler. Conduit 34 is then blocked off and the precipitation portion of the cycle is commenced by gradually reducing the pressure on batch cooler 36. As the pressure is lowered a portion of the cyclohexane vaporizes and passes upwardly through conduit 50, condenser 52, and into accumulator 58. Material condensed in 52 is removed from the accumulator through conduit 62 and returned by means of pump 60 to the batch cooler. As desired, a portion of the condensate can be yielded from the system. As cyclohexane vaporizes the temperature in the batch cooler is reduced and solid ethylene polymer begins to precipitate from solution. This operation is continued until the pressure reaches substantially atmospheric pressure at which point the solution temperature is reduced to about 180° F. At this point about 75 percent of the polymer has precipitated from solution. The entire cooling process is carefully controlled and the pressure in the batch cooler is reduced at a rate so as to provide a substantially uniform rate of temperature reduction, namely, about 7.5° F. per minute. Upon completion of the pressure reduction portion of the cycle additional cooling of the polymer solution is provided whereby the total percentage of precipitate polymer is increased to about 95 percent. In this particular example the additional cooling is provided by introducing cold solvent at a temperature of about 100° F. to the batch cooler through conduit 48. Sufficient solvent is introduced to provide a reduction in temperature to about 120° F. Following the final cooling step the precipitated polymer and solvent are withdrawn from the batch cooler through conduit 64 and discharged through pump 66. To prevent possible plugging of the discharge line, it is desirable that the material in the batch cooler be maintained in a sufficient state of agitation to disperse the precipitated polymer in the solution thereby forming a polymer slurry. A stirrer 38 driven by motor 40 is provided for this purpose.

Although the polymer has been precipitated from solution, it is still necessary that this material be recovered from the solvent. For this purpose there is provided a polymer recovery step 74 wherein solvent and polymer are separated by suitable means, such as, by centrifugation or filtration followed by drying. The polymer product is discharged from the polymer recovery step through conduit 78 and solvent recovered therein is removed through conduit 76 for reuse as desired in the polymerization process.

It is to be noted that in the drawing presented alternative methods and means are provided for carrying out various steps of the process. For example, the additional cooling required after precipitation by autorefrigeration can be supplied other than by introducing cold solvent to the batch cooler. If it is desired to use indirect heat exchange a double walled batch cooler 42 can be used with coolant being introduced through conduit 44 and withdrawn through conduit 46. Also, the additional cooling can be provided after the material is removed from the batch cooler by passing the slurry through a cooler 68. In place of mechanical agitation the required turbulence in the batch cooling zone can be provided by recycling withdrawn slurry through conduit 70 and the batch cooler. When operating under conditions which produce stringy polymer, namely when mechanical agitation cannot be tolerated at the conditions prevailing in the batch cooler at atmospheric pressure, an additional reduction in pressure and additional cooling in the batch cooler without agitation can be provided by employing a barometric leg 56 in combination with the overhead condensing and accumulating system. When this procedure is employed it is desirable that inert materials such as air, which may enter the system when the batch cooler is under a vacuum, be vented from condenser 52 through conduit 54 in the initial portion of the autorefrigeration step when the pressure in batch cooler 36 is above atmospheric.

The following data is presented to illustrate typical applications of preferred embodiments of the invention on a commercial scale. Two examples are presented. In the first example the additional cooling is provided by introducing cold solvent to the batch cooling zone. In the second example a barometric leg followed by indirect heat exchange provides the additional cooling.

The ethylene polymer of these examples was prepared in the presence of a catalyst comprising 2.5 percent by weight of chromium as chromium oxide, containing 2.2 percent by weight hexavalent chromium, with silica-alumina prepared by impregnating particulate silica-alumina with a solution of chromium oxide followed by drying and activation in air at gradually increasing temperatures up to 950° F.

*Example I*

| Flows: | | Lb./hr. |
|---|---|---|
| Feed to Reactor (8) | | 43,000 |
| Composition— | | |
| Ethylene | wt. percent | 13.40 |
| Cyclohexane | do | 86.40 |
| Catalyst | do | 0.20 |
| | | 100.00 |
| Reactor Effluent (10) | | 43,000 |
| Composition— | | |
| Ethylene | wt. percent | 5.40 |
| Cyclohexane | do | 86.40 |
| Ethylene polymer | do | 8.00 |
| Catalyst | do | 0.20 |
| | | 100.00 |
| Feed to flash concentrator (30) | | 115,000 |
| Composition— | | |
| Ethylene | wt. percent | 0.15 |
| Cyclohexane | do | 97.00 |
| Ethylene polymer | do | 2.85 |
| | | 100.00 |
| Feed to batch coolers (36) (one of two) | | 80,000 |
| Composition— | | |
| Ethylene | wt. percent | 0.02 |
| Cyclohexane | do | 95.92 |
| Ethylene polymer | do | 4.06 |
| | | 100.00 |
| Ethylene polymer precipitated by autorefrigeration | | 2445 |
| Ethylene polymer precipitated by addition of cold solvent | | 725 |

| Temperatures, ° F.: | |
|---|---|
| Reactor (8) | 285 |
| Catalyst removal (24) | 300 |
| Flash concentrator (30) | 225 |

| Pressures, p.s.i.a.: | |
|---|---|
| Reactor (8) | 500 |
| Catalyst removal (24) | 150 |
| Flash concentrator (30) | 33 |

Operating cycle of batch cooler:
7.5 minutes for filling. Temperature 225° F.—pressure 33 p.s.i.a.
6 minutes for cooling by autorefrigeration. (7.5° F. per minute.) Final temperature—180° F.
8 minutes for cooling by cold solvent addition. Final pressure—15.0 p.s.i.a.; final temperature—120° F.; final pressure—5.2 p.s.i.a.
7.5 minutes for draining.
7.5 minutes for reheat.

Batch cooler size: 6,000 gallons. Filled approximately ½ full before beginning each cooling cycle.

Example II

Operating cycle of batch cooler:
- 7.5 minutes for filling — Temperature 225° F.—pressure 33 p.s.i.a.
- 6 minutes for cooling by autorefrigeration (without vacuum) — (7.5° F. per minute); final temperature—180° F.; final pressure—15 p.s.i.a.
- 3 minutes for cooling (with barometric leg) — Final temperature—170° F.; final pressure—13 p.s.i.a.
- 5 minutes for cooling (with indirect heat exchange) — Final temperature—120° F.
- 7.5 minutes for draining.
- 7.5 minutes for reheat.

Polymer product:
- Ethylene polymer precipitated by autorefrigeration (without vacuum) _____ lb./hr__ 2445
- Ethylene polymer precipitated by barometric leg _____ do__ 340
- Ethylene polymer precipitated by indirect heat exchange _____ lb./hr__ 385

Batch cooler size: 6,000 gallons_____ Filled approximately ½ full before beginning each cooling cycle.

When operating in accordance with Example II it is found that agitation of the polymer and solvent in the batch cooling zone following the batch cooling cycle, namely after the temperature is reduced to 170° F., has no appreciable deleterious effect on the characteristics of the polymer precipitate. Thus this process provides a homogeneous mass of finely divided polymer solids having the desired physical properties previously discussed.

Having thus described the invention by providing a specific example thereof, it is to be understood that no undue restrictions or limitations are to be drawn by reason thereof and that many variations and modifications are clearly within the scope of the invention.

I claim:

1. A process for the removal of solid olefin polymers from a liquid solution which comprises removing heat from the solution in a precipitation zone at a sufficient rate to provide a substantially uniform rate of temperature decrease by reducing the pressure on the solution to substantially atmospheric pressure and vaporizing liquid therefrom whereby solid polymer is precipitated, said precipitated polymer being subject to agglomeration due to mechanical agitation during the latter portion of the heat removal step, thereafter removing additional heat from the solution without vaporizing liquid from said solution in the absence of mechanical agitation through the temperature range in which agglomeration would be produced by mechanical agitation whereby additional polymer is precipitated, commencing agitation of the polymer and liquid and removing polymer and liquid from said precipitation zone.

2. The process of claim 1 wherein said polymer comprises an ethylene polymer having a specific gravity of at least 0.94 at 20° C. and a crystallinity of at least 70 percent at ordinary atmospheric temperatures.

3. The process of claim 2 in which the cooling through the agglomeration temperature range is provided by introducing cold solvent to the batch cooling zone.

4. The process of claim 2 in which the additional cooling through the agglomeration temperature range is provided by a barometric leg and condensing system.

5. In a process for the precipitation of solid ethylene polymer from a liquid solution of cyclohexane in which a major portion of the polymer is precipitated in a batch cooling zone under conditions of controlled cooling by the reduction in the pressure on the solution to atmospheric pressure and vaporization of liquid from the solution in which the precipitated polymer is removed as a slurry from the batch zone for further cooling, agitation being provided during at least the removal step to assure maintenance of the polymer slurry, and in which the polymer is subject to agglomeration due to mechanical agitation during the temperature conditions existing during the latter portion of the cooling operation, the improvement which comprises cooling the solution without vaporizing liquid from said solution in the absence of mechanical agitation when said solution temperature is in the range of about 180° F. to 170° F., thereafter providing the agitation required to effect removal of the polymer as a slurry from the batch cooling zone and removing additional heat from the solution without vaporizing liquid from said solution whereby additional polymer is precipitated.

6. The process of claim 5 in which the additional cooling through the agglomeration temperature range is provided by a barometric leg and condensing system.

7. The process of claim 6 in which the polymer slurry removed from the batch cooling zone is subjected to additional cooling by indirect heat exchange with a coolant material.

8. The process of claim 5 in which the cooling through the agglomeration temperature range is provided by introducing cold solvent to the batch cooling zone.

9. The process of claim 8 in which the polymer slurry removed from the batch cooling zone is subjected to additional cooling by indirect heat exchange with a coolant material.

References Cited in the file of this patent

UNITED STATES PATENTS

| | | |
|---|---|---|
| 1,836,211 | Weiland et al. | Dec. 15, 1931 |
| 2,388,160 | Krase | Oct. 30, 1954 |
| 2,691,647 | Field et al. | Oct. 12, 1954 |
| 2,728,753 | Russum et al. | Dec. 27, 1955 |
| 2,728,755 | Weisemann | Dec. 27, 1955 |
| 2,780,617 | Zletz | Feb. 5, 1957 |
| 2,825,721 | Hogan et al. | Mar. 4, 1958 |
| 2,858,902 | Cottle | Nov. 4, 1958 |

OTHER REFERENCES

Chemical Engineers Handbook (Perry), published by McGraw-Hill (New York), 1952 (pages 1224 and 1456 relied on).